United States Patent [19]

Kirsch

[11] 4,436,373
[45] Mar. 13, 1984

[54] SOLAR REFLECTOR PANEL

[75] Inventor: Paul A. Kirsch, Bensalem, Pa.

[73] Assignee: The Budd Company, Troy, Mich.

[21] Appl. No.: 277,097

[22] Filed: Jun. 25, 1981

[51] Int. Cl.³ .......................... G02B 7/18; G02B 5/10
[52] U.S. Cl. .................................. 350/296; 350/590; 350/292
[58] Field of Search ............... 350/293, 296, 288, 320, 350/590; 264/1.9, 1.2

[56] References Cited

U.S. PATENT DOCUMENTS 3,427,095 2/1969 Dykema et al. ..................... 350/288
3,985,429 10/1976 Fleischer ............................. 350/288

FOREIGN PATENT DOCUMENTS 749441 11/1944 Fed. Rep. of Germany ...... 350/296

Primary Examiner—Jon W. Henry
Attorney, Agent, or Firm—Edward M. Farrell; Herman Foster; Thomas I. Davenport

[57] ABSTRACT

A solar reflector panel includes a glass reflector element held by a thermoset plastic backing. The backing is molded around the reflector element to provide lips to lock the element in place on the backing.

1 Claim, 5 Drawing Figures

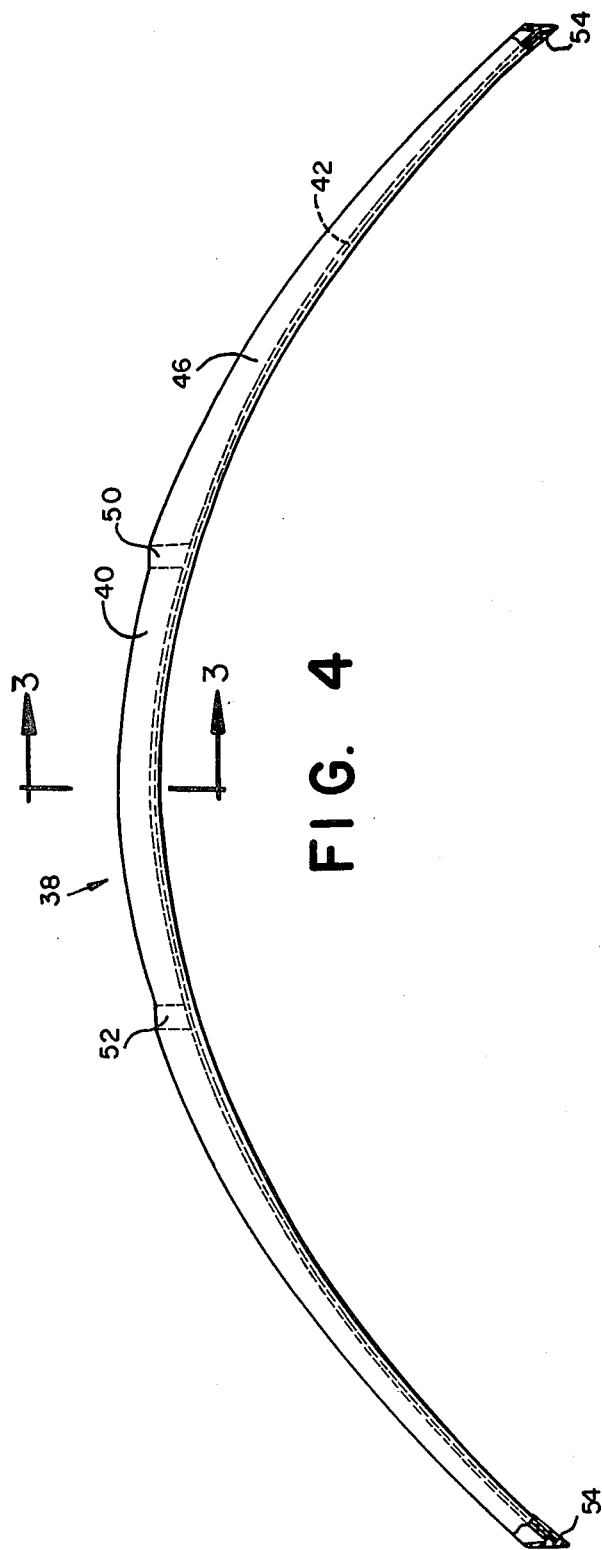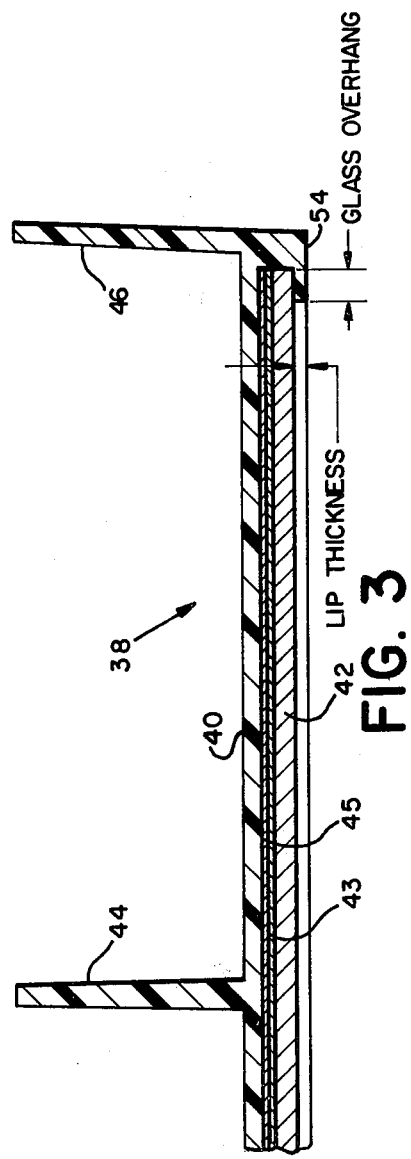

SOLAR REFLECTOR PANEL

BACKGROUND OF THE INVENTION

Solar reflector panels for reflecting energy from the sun to a receiver are well known. Generally, an array of aligned reflector panels are mounted on a strongback and are rotatable to permit them to receive maximum energy from the sun. The energy reflected to the receiver is generally used to heat a liquid, such as oil or liquid which is circulated to transfer the heat to a home or other utilization means.

Solar reflector panels can be made of parabolic mirror elements which are secured to and supported by backing members. These backing members are generally made of solid frame material and could be made of metal stampings of a type described in a copending application entitled "Panel for Solar Heating Systems", Ser. No. 185,360, filed Sept. 8, 1980, and assigned to the same assignee as the present invention.

While such solar reflector panels utilizing frame metal backings are generally acceptable, it is often desirable to provide panel reflectors which minimize the number of parts required while at the same time, provide adequate locking and protection of the reflector elements to the backings. Providing locking and protection of the reflector elements with integral backing units of high resistance and durability is also desirable in many cases. This is especially true since such reflector elements are generally exposed to severe environmental conditions including snow and winds up to 90 m.p.h., for example.

OBJECTS OF THE INVENTION

It is an object of this invention to provide improved solar panel reflectors and methods for making them.

It is a further object of this invention to provide improved solar panel reflectors, and methods for making them, having improved molded backings.

It is still a further object of this invention to provide improved solar panel reflectors, and methods for making them, having molded backings with improved means for locking the reflectors thereto.

It is still a further object of this invention to provide improved solar panel reflectors, and methods for making them, having improved molded backings which protect the reflective elements of the panel reflectors.

It is still a further object of this invention to provide an improved backing for reflective elements which is capable of withstanding severe loading conditions and adapted for long term outdoor use.

BRIEF SUMMARY OF THE INVENTION

In accordance with the present invention, methods and means are provided to produce an improved solar reflector panel. A fiber reinforced thermoset piece is molded to hold a glass sheet which has a suitable reflective and protective coating. During the molding process, molding compound material is placed on the protective coating on the rear surface of the glass sheet and the material, under pressure and temperature, extends around the sides of the sheet to provide a lip or extending portion to mechanically lock the reflective sheet in an accurate contour after the molding material has cured. The lip of the molding compound keeps the reflective sheet and molding compound together and prevents the sheet from popping loose under severe loading conditions and also provides an environmental barrier to the reflective coating necessary for long term outdoor use.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 3 is a partial cross-sectional view taken along lines 3—3 of a typical solar reflector panel illustrated in FIG. 4;

FIG. 4 is a parabolic solar reflector panel, in accordance with the present invention.

DETAILED DESCRIPTION OF THE PREFERRED EMBODIMENTS

Figure 1:
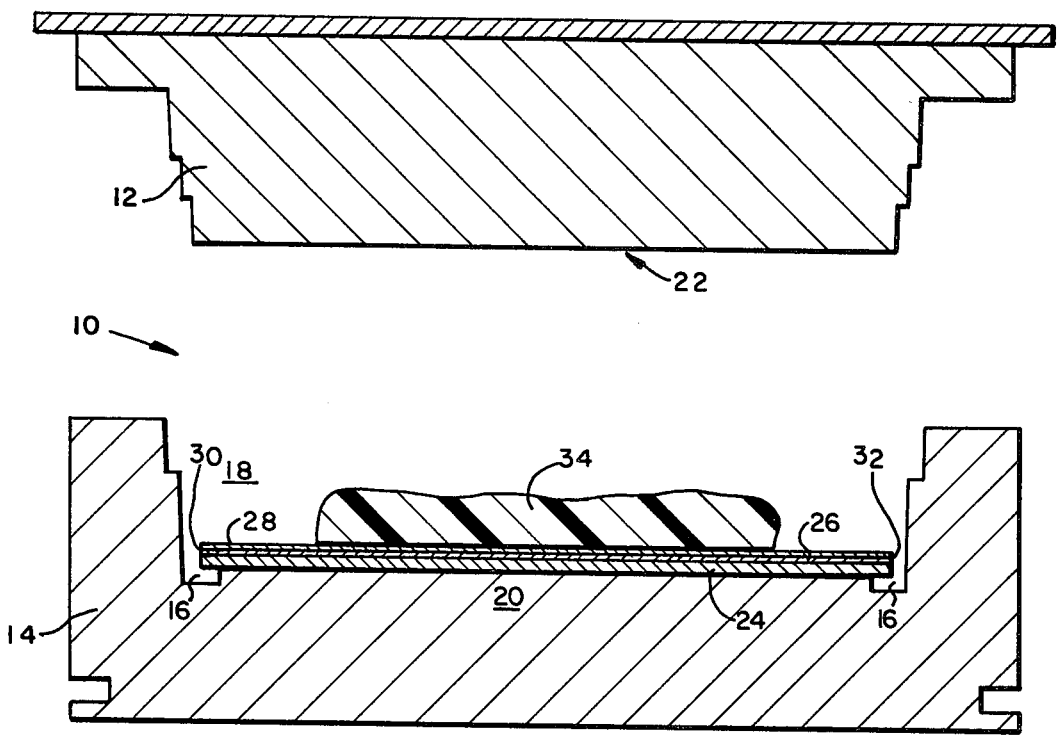
FIG. 1 is a cross-sectional view, before pressure application, illustrating a step in a compression molding process for making a solar reflector panel, in accordance with the present invention.
Figure 2:
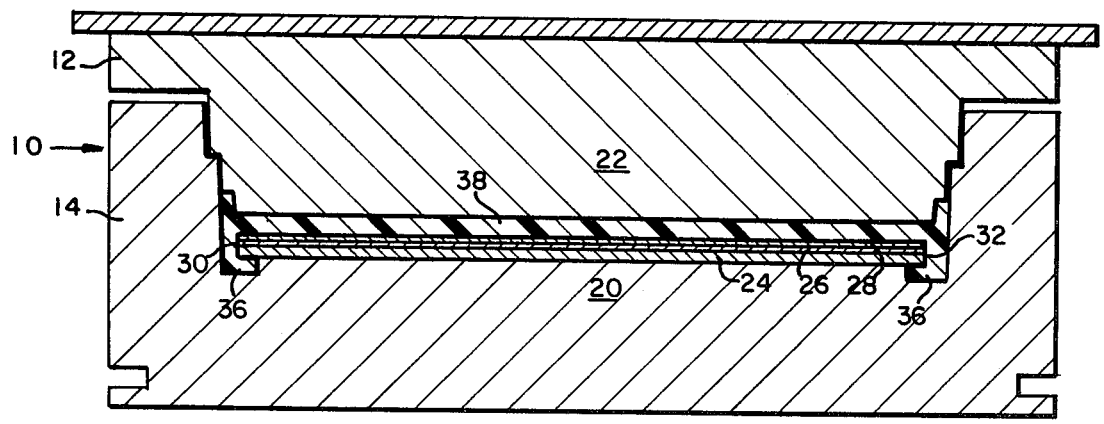
FIG. 2 is a cross-sectional view, during pressure application, illustrating another step in a compression molding process following the step illustrated in FIG. 1.

Referring to FIGS. 1 and 2, there will first be described a molding process which is applicable to forming a solar reflector panel to be discussed and described in detail in subsequent FIGS. 3, 4 and 5. It is understood that the term solar reflector panel includes the complete panel, such as the glass with a silver reflective coating, for example, protective coating for the reflective backing and a solid backing element or frame for holding the glass. A heated mold 10 comprises a first upper male and second lower female mold pieces 12 and 14. These pieces 12 and 14 each comprise half of the mold and are movably disposed with respect to each other, for example, the piece 12 is adapted to be lowered toward the piece 14. The mold pieces 12 and 14 may be generally rectangular in shape and in the embodiment illustrated are designed to co-mold fiber glass reinforced plastic material with a rectangular glass sheet suitably coated.

The lower piece 14 includes a groove 16 toward the bottom of the cavity 18 of the piece 14, which extends around the inner periphery thereof. The central part 20 of the mold piece 14 is shaped to receive a reflector element, as will be described. The portion 20 may be parabolic or any suitable shape dependent upon the shape of the reflector element to be received thereon.

The upper piece 12 includes a male portion 22 which is adapted to be moved into the cavity 18. The portion 22, except for structural considerations such as ribs, as illustrated in FIG. 3, is generally shaped to the same contour as the cavity 18.

The mold 10 is utilized in conventional compression molding processes wherein an upper half of a mold is lowered into the lower half to form a molded piece. Such processes are well known and will not be described in detail except to say that such molding processes involve controlled heating of the mold pieces and selectively controlled relative movements of the mold pieces. The various means for selectively moving the piece 12 towards the piece 14 are well known in the compression molding art.

A rectangular glass sheet 24 is clear on its front surface and is coated on its rear surface in a conventional manner, for example, by a reflective coating 26, such as a coating of silver, on one side and a protective coating 28, such as paint, on the back of the reflective surface 26. The thicknesses of the coatings on the glass are illustrated greatly exaggerated. The glass sheet 24 with its reflective coating comprises a conventional mirror-like element used to reflect energy which is directed thereon, for example, energy received from the solar rays.

The glass sheet 24 comprises four edges, with only the side edges 30 and 32 being illustrated. The mold 10 is designed to receive the glass sheet 24 in the manner illustrated so that the four edges of the glass sheet extend beyond the portion 20 partly over the groove 16 extending around the periphery of the lower mold piece 14.

Molding compound 34, suitable for producing high strength fiberglass reinforced thermoset plastic backing or framing for the glass, is placed on the protective surface 28 which is on the silver coating 26 of the glass sheet 24. The heated male mold or top piece 12 is then lowered toward the heated female mold half piece 14. The mold halves, which are coiled for steam or oil heating, not illustrated, are generally mounted in a hydraulic press, also not illustrated. As mentioned, the lower mold piece 14 is grooved about its periphery to provide the groove 16. The various sizes of the grooves and glass sheets are dimensioned to provide the correct overhang of its four edges, such as edges 30 and 32, to allow the sheet of glass 24 to be placed in the mold in the proper position to permit the molding compound 34 to flow under the four edges into contact with the outer edge portions of the front surface of the glass 24.

FIG. 2 illustrates the mold piece 12 in an operative down position with respect to the piece 14. In this position, the molding compound 34 is spread out about the entire protective surface 28 which is coated to the back or top surface of the glass 24, which also includes the reflective mirror coating 26. As illustrated, the material 34 extends around the four side edges of the glass into the groove 16 to provide a lip 36 about the front periphery of the glass 24. The molding compound 34 flows around and under the glass to provide mechanical locking for the glass sheet 24. The thermoset material 34 is then permitted to cure to provide a hard integral backing for the glass sheet 24. The hardened compound material lip provides a strong mechanical locking means which holds the glass sheet in an accurate contour necessary for efficient solar panel reflectors. The lip 36 of the molding compound also gives an added safety feature in keeping the glass 24 and molding compound together, preventing the glass from popping loose under severe loading conditions which could possibly cause injury to by-standers. The lip 36 of the molding compound also provides an environmental barrier necessary for long term outdoor use of solar panel reflectors.

The molding steps illustrated in FIGS. 1 and 2 illustrate the general arrangement for the process for producing a solar panel embodying the present invention. It is apparent that the two mold pieces may be of any configuration designed to accommodate the particular design of the back up material to be used for the glass sheet.

Referring to FIG. 3, a portion of a solar panel 38 includes the thermoset material in a hardened state illustrated as being a backing 40. The backing 40 is adapted to hold the glass sheet 42 which includes reflective surface 43 and protective coating 45 similar to those illustrated in FIGS. 1 and 2. The backing 40 includes a pair of ribs 44 and 46 which are added to the backing for strength and stiffness. Any number of ribs may be used dependent on the backing design. The cavities for forming the ribs would normally be built into the mold pieces which mold the backing. The cavities for molding the ribs were not illustrated in FIGS. 1 and 2.

Referring to FIG. 4, the solar panel 38 is illustrated with attachment points provided by elements 50 and 52. The backing 40 receives a glass sheet 42 which is held by the lip 52 forming part of the backing. The glass sheet 42 includes a silver coating 43 and protective coating 45. The solar panel illustrated is parabolic in shape with the molded material being around the glass and the lip 54 being disposed around the periphery of the sheet of glass 42. The back-up material holds the glass with reflective and protective coatings in an accurate parabolic shape with the help of the molded lip of the compound molding material around the periphery of the glass.

Some combinations found acceptable in experiments have involved the following dimensions: 0.060 inch lip thickness with 0.125 inch glass overhang; 0.060 inch lip thickness with 0.25 inch glass overhang; 0.125 inch lip thickness with 0.250 inch glass overhang; and 0.040 inch lip thickness with 0.250 inch glass overhang. The number of sides providing the lip of molding compound can vary from one to all four. A preferred embodiment of the invention involves a lip extending on the four front edges of the glass sheet. All of the combinations mentioned were successful in that a clearly defined lip of molding compound was molded under the glass surface without breaking the glass.

Figure 5:
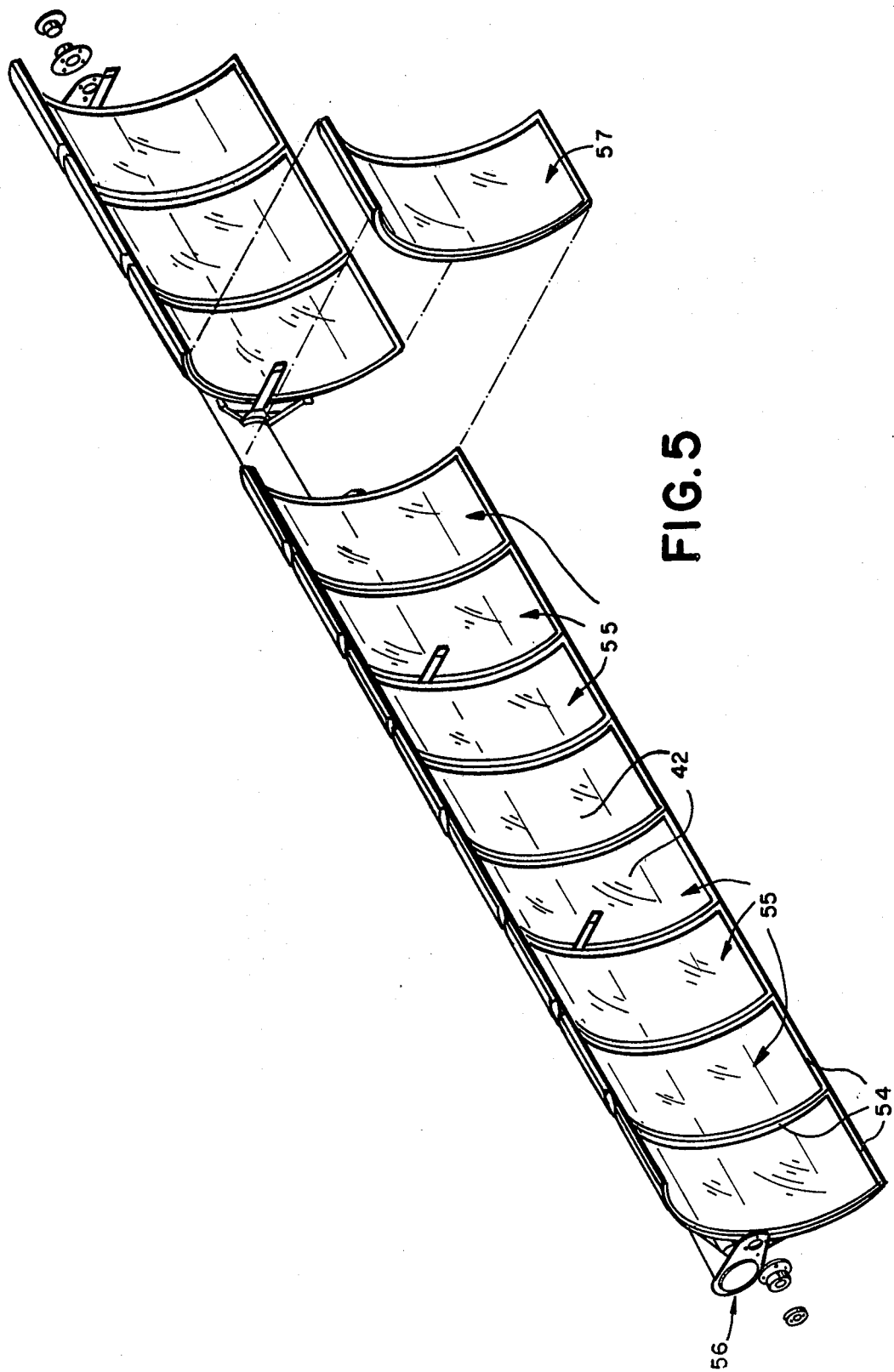
FIG. 5 illustrates an array of solar reflector panels of the type utilizing the present invention.

Referring particularly to FIG. 5, a plurality of panels 55, which may have a backing with rib sections of the type illustrated in FIG. 4, are shown. The panels are mounted upon a strongback assembly 56 which may be connected to means to move the panels in a direction to receive maximum energy from the sun. A lip of molded material surrounds the periphery of each of the panels 55. A panel 57 is illustrated away from a strongback to show some of the details of the solar panel with the reflective glass material within the molded material. Various collector elements generally used with a system such as illustrated in FIG. 5 are not illustrated because they do not form part of the invention.

The present invention has provided a solar panel in which a single structure is used as the backing for the reflector elements. No bonding of the reflector element to the backing is required. However, in some cases, an adhesive may be used on the rear surface of the glass to provide bonding of the glass to the back-up material. The material of the back-up material is made relatively strong and capable of withstanding severe environmental conditions.

The glass material used for the sheets of glass generally comprises chemically strengthened glass. The basic problem involves providing the lip around the glass surface during the molding process without breaking the glass. Consequently, the relationship between the overhang of the glass within the mold and the lip formed must be kept with certain dimensions, some examples of which have been discussed in connections with FIG. 4.

While glass has been mentioned throughout the specification, it is apparent that other transparent materials which transmit light may be used. Such materials must be capable of withstanding the temperature and pressure found in conventional compression molding processes.

What is claimed is:

1. A parabolic solar reflector panel for focusing energy received from the sun comprising:
   (a) a glass sheet with four side edges and having front and rear surfaces;
   (b) said rear surface of said glass sheet having a reflective coating thereon;
   (c) said reflective coating having a protective coating thereon;
   (d) an integral fiberglass reinforced thermoset piece having a plurality of rib portions secured to said protective coating to provide a backing of uniform thickness for said glass sheet with said reflective and protective coatings;
   (e) said piece extending around the four side edges of said glass sheet and extending partly across the front surface thereof to provide a lip portion about the periphery of said glass sheet to mechanically lock said sheet to said piece;
   (f) said lip portion extending from 0.25" to 0.125" over the front surface of said glass sheet and having a thickness between 0.040" to 0.125";
   (g) attachment elements disposed on said solar panel;
   (h) a strongback assembly;
   (i) means including said attachment elements to connect said solar reflector panel to said strongback; and
   (j) said strongback assembly being movable to move said reflector panel in a direction to receive maximum energy from the sun.

* * * * *